H. F. SCHROEDER.
FAUCET.
APPLICATION FILED MAR. 26, 1908.
978,660.
Patented Dec. 13, 1910.
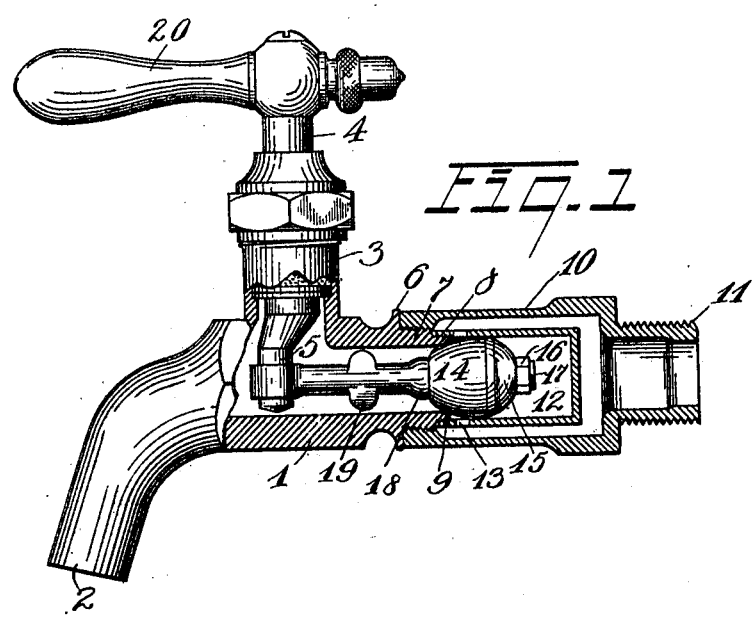
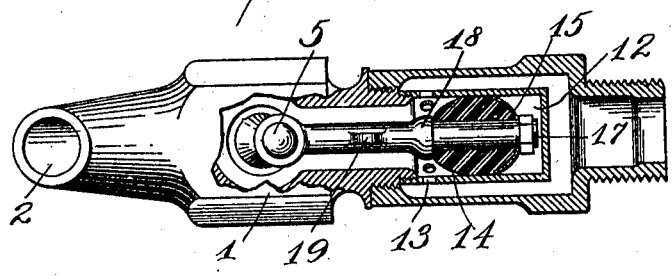
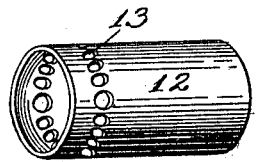
Witnesses:
Inventor,
Henry F. Schroeder,
By Bates, Fouts & Hull,
Attys.

UNITED STATES PATENT OFFICE.

HENRY F. SCHROEDER, OF CLEVELAND, OHIO.

FAUCET.

978,660.  Specification of Letters Patent. Patented Dec. 13, 1910.

Application filed March 26, 1908. Serial No. 423,405.

*To all whom it may concern:*

Be it known that I, HENRY F. SCHROEDER, a citizen of the United States, residing at Cleveland, in the county of Cuyahoga and State of Ohio, have invented a certain new and useful Improvement in Faucets, of which the following is a full, clear, and exact description, reference being had to the accompanying drawings.

This invention relates to faucets of the type employed in connection with sinks and basins, and particularly those wherein a rubber valve body is moved toward and from a valve seat, such movement being longitudinally of the water-way of the faucet. Such valve bodies are commonly operated by means of a rotary plug or shaft to one end of which an operating handle is attached and having at its opposite end a crank connected to the valve body by means of a link. In the operation of faucets of this type, it has been found that they are liable to produce water-hammer and that the looseness of the link causes a disagreeable rattling during the flow of water through the faucet. Rubber is ordinarily employed in the construction of the valve body. Where soft rubber is employed, the valve body swells, and this swelling adds to the water-hammer effect referred to. It has been proposed to obviate this swelling by employing hard rubber as the material for the valve body, but the latter material breaks in use and renders the valve leaky.

It is the object of my invention to produce a faucet of the type described which shall be free from the objections noted and which shall be simple and economical in construction and efficient in use. I accomplish these results by the construction embodied in the drawings forming a part hereof, wherein—

Figure 1 represents a view, partly in side elevation and partly in section, of a faucet constructed in accordance with my invention; Fig. 2 represents a view, partly in bottom plan and partly in section, of the faucet shown in Fig. 1; and Fig. 3 represents a perspective view of the sleeve which I employ in connection with my valve.

Generally speaking, the invention may be defined as consisting of the combinations of elements embodied in the claims hereto annexed.

Describing the parts by reference characters, 1 denotes the body of the faucet, the same being preferably of cast brass and having a nozzle 2 and an upwardly projecting integral sleeve 3 within which there is journaled a shaft 4 having at the lower end thereof the crank 5. The rear or inlet portion of the faucet casing is provided with an outwardly projecting flange 6 and has beyond such flange two exteriorly threaded portions 7 and 8, the latter portion being of less diameter than the former and having its inner surface beveled to form a valve seat 9 at the extreme rear or inlet end of the faucet body.

10 denotes an enlarged sleeve having at one end thereof a threaded connection 11 for the supply pipe and having its other end provided with an internal thread adapting it to be fitted to the portion 7 of the faucet body.

12 denotes a cap or casing of considerably smaller diameter than the internal diameter of 10, having its rear end closed and its front end provided with an internal thread by means of which it is fitted to the reduced portion 8 of the faucet body. Casing 12 is provided with an annular series of ports 13 extending therearound and located immediately at the rear of the valve seat 9 formed on the inlet end of the faucet body.

The valve is mounted within the cap or casing 12 and comprises a soft-rubber body 14 having applied to the rear end thereof a metallic cap 15 which forms a backing for a nut 16 on the threaded end of link 17, which extends through the valve body and is connected at its forward end to the crank 5. The link 17 is provided with a shoulder 18 between which and the nut 16 the valve body 14 is clamped; also with a pair of oppositely-projecting lugs 19 which are adapted to center said link with reference to the faucet body.

With the construction above described, the operation will be as follows:—By rotating the operating handle 20 in either direction from that shown in Fig. 1, the valve body 14 will be moved rearwardly and water will flow freely through the ports 13. On closing the valve, the flow of water through ports 13 is cut off, but without any pressure being exerted by the water upon the rear end of the valve-body. In fact, the rearward and upward inclination of the valve-body from ports 13 causes the water flowing through said ports to resist, rather than aid, the closing of the valve. As there is generally more or less lost-motion between the crank 5 and link 17, the pressure of the water on the rear end of the valve body 14 in constructions heretofore in general use tends to close the valve quickly and produce water-hammer. This effect is increased, where soft-rubber is employed for the valve body, by the swelling of such body. In my construction, however, the water never impinges upon the rear end of the valve body and any tendency of the valve body to swell is prevented by the inclosing casing 12. Furthermore, the sleeve 10, being of considerably greater internal diameter than the diameter of casing 12, provides an expansion chamber for the water flowing through the faucet, which also contributes to the prevention of water-hammer. The casing or cap 12 serves as a guide for the valve-body, insuring accurate seating of the same and, as the casing fits the exterior of the body more or less closely, any tendency of the link to oscillate and rattle within the faucet body is overcome.

Having thus described my invention, I claim:

1. In a faucet, the combination of a faucet body having its rear or inlet end beveled to form a tapered valve seat and provided outside of such end portion with a thread and having a thread in front of the former thread, a casing fitted to the first thread and provided adjacent to the inlet end of the body with a plurality of ports, said casing being closed at its rear end, a second casing surrounding the former casing and threaded on to the second thread of the body and forming with the former casing a chamber, a valve body of soft rubber mounted in the first mentioned casing and having a tapered surface adapted to engage the tapered seat on the end of the faucet body, a link connected with the valve body, and a faucet shaft connected with said link.

2. In a faucet, the combination of a body having a passageway therein and provided at its rear or inlet end with a beveled seat, a casing projecting rearwardly from said seat and provided adjacent to said seat with a series of apertures, a casing surrounding the first mentioned casing and forming therewith a chamber, a soft rubber valve body mounted in the first mentioned casing and having a tapered surface extending rearwardly of said apertures and adapted to engage the beveled seat, and means for moving said valve body toward and from its seat.

In testimony whereof, I hereunto affix my signature in the presence of two witnesses.

HENRY F. SCHROEDER.

Witnesses:
J. B. HULL,
BRENNAN B. WEST.